United States Patent [19]

Barks

[11] Patent Number: 4,765,629

[45] Date of Patent: Aug. 23, 1988

[54] SEALING SYSTEM FOR COMBUSTIBLE ENGINES AND THE LIKE

[75] Inventor: Michael D. Barks, West Palm Beach, Fla.

[73] Assignee: Mario Boiardi, St. Michael's, Md.

[21] Appl. No.: 940,403

[22] Filed: Dec. 11, 1986

[51] Int. Cl.$^4$ ............................ C09K 3/12; F16J 15/14
[52] U.S. Cl. .................................... 277/1; 277/237 R; 277/DIG. 6; 106/33; 252/8.512; 252/72
[58] Field of Search ...................... 277/1, 237, DIG. 6; 106/33; 252/72, 8.512

[56] References Cited

U.S. PATENT DOCUMENTS

| | | | |
|---|---|---|---|
| 1,648,866 | 11/1927 | Ray | 252/72 X |
| 1,722,437 | 7/1929 | Meneray | 106/33 |
| 1,746,028 | 2/1930 | Churchill | 106/33 |
| 1,808,637 | 6/1931 | Colberg et al. | 106/33 |
| 1,868,195 | 7/1932 | Cumming et al. | 106/33 |
| 2,205,609 | 6/1940 | Vail et al. | 252/8.512 |
| 3,417,018 | 12/1968 | Burns | 106/33 X |
| 3,433,655 | 3/1969 | Nugent | 106/33 |
| 4,524,159 | 6/1985 | Barber | 106/33 X |

FOREIGN PATENT DOCUMENTS 2485677 12/1981 France ...................................... 277/1

*Primary Examiner*—Robert S. Ward
*Attorney, Agent, or Firm*—Connolly & Hutz

[57] ABSTRACT

A sealing system for combustible engines and the like includes solid particles for plugging large holes or cracks. The solid particles are carried by a liquid which can flow into smaller cracks and then quickly solidify to seal those smaller cracks.

15 Claims, No Drawings

SEALING SYSTEM FOR COMBUSTIBLE ENGINES AND THE LIKE

BACKGROUND OF INVENTION

This invention relates to a sealing system for combustible engines and the like and particularly for sealing cracks in such devices as heating cores, freeze plugs, radiators, thermostats, cracked or warped heads and blown head gaskets. The most common approach generally taken to repair such cracks is to utilize solid particles carried by a liquid for conveying the particles to the cracks. In this conventional approach the solid particles act as plugs for sealing the cracks. A difficulty with this conventional approach is that it is applicable only to large cracks with varying effectiveness but is not effective with respect to very small cracks which are too small for the particles to enter. Another disadvantage with such conventional techniques is that such techniques operate too slowly.

A variation of the above conventional techniques which have been considered is to completely omit the solid particles as the sealant and instead to use as the sealant a pure liquid. In this variation the liquid flows into all cracks and openings whether large or minute. The components of the liquid are such that upon the application of heat, such as by starting the engine, the liquid solidifies and thereby is intended to close or seal the cracks. While this variation is a marked improvement over the conventional techniques it is not as effective as might be desired for quickly sealing large cracks or holes.

SUMMARY OF INVENTION

An object of this invention is to provide an improved sealing system which has the advantages but not the drawbacks of the above systems.

A further object of this invention is to provide such a sealing system which provides sufficient strength and durability to effectively withstand pressure that might be applied.

A still further object of this invention is to provide such a system which is characterized by its quickness in sealing cracks regardless of the size of the cracks.

In accordance with this invention the sealing system includes a liquid carrier for solid particles. Unlike the conventional system, however, the liquid carrier itself is capable of solidification. Thus the invention utilizes the advantages of the prior techniques by initially closing large cracks and openings with the solid particles and utilizing the liquid to fill the tiny cracks and to complete the filling of the large cracks upon solidification of the liquid.

DETAILED DESCRIPTION

In its broadest aspect the present invention is directed to providing a sealing system for effectively sealing holes or cracks in any type of device wherein the larger size holes and cracks are initially at least partially sealed by solid particles which are in a liquid carrier. Some means is then utilized to cause the liquid carrier to solidify. In this manner, the solidification takes place after the liquid carrier has penetrated the smaller holes or cracks and has completely filled the larger holes or cracks which had been plugged by the solid particles. The solid particles function as bonding agents to which the liquid becomes attached while solidifying. The solidification of the carrier can take place in any suitable manner. For example, a reactant or catalyst can be added to the liquid carrier immediately after time of insertion and thereby utilize a chemical reaction to cause solidification. In the preferred form of this invention, however, the solidification takes place as a result of heat being applied to the liquid carrier.

By utilizing heat to cause solidification the invention is particularly useful for sealing cracks or holes in combustible engine or its cooling system. For example, the invention may be utilized for sealing cracked or warped heads or blown head gaskets in an engine or for sealing heating cores, freeze plugs, radiators or in the cooling system. The engine or cooling system may be of a gasoline or diesel type in cars, trucks or boats.

In a preferred embodiment of this invention a liquid part of sealant is obtained by mixing ten fluid ounces of sodium silicate in liquid form with five fluid ounces of water to which is added one ounce of silver solder flakes as the solder particles. If desired, the solid particles may be lead solid flakes or pure ground pepper or maybe any combination of silver and/or lead solder flakes and pepper.

It is to be understood that the invention may be practised with other amounts of these materials or with the substitution of other materials. The preferred example, however, is particularly suitable because it results in solidification quickly taking place upon the reaching of a predetermined temperature. For example, when a temperature of 150° F.–190° F. is reached solidification takes place in as few seconds such as 5–10 seconds.

Advantageously, the high temperature necessary for solidification is obtained by starting the engine to thereby heat the engine. It is preferred that the sealant is poured into a cold radiator so that by the time the engine is turned on the sealant has already flowed into the block and filled the cracks.

The invention is characterized by a seal having great strength and integrity sufficient to withstand the normal pressures to which it would be subjected. A particularly great advantage is the quickness or speed in which the sealing action takes place. A further advantage is the ability of the sealant to penetrate tiny cracks and thereby prevent such cracks from getting larger.

In general, the invention applied to sealing any type of cracks wherein liquid may flow into the cracks. As noted above, such cracks would then be effectively sealed in a rapid period of time. The cracks may be in combustible engines or their cooling systems or may be in other devices such as home or building heating systems.

I claim:

1. A sealing system for combustible engines and engine cooling systems and the like comprising a liquid carrier for flowing into cracks and openings, solid particles in said liquid carrier for plugging large cracks and openings, and said liquid carrier being capable of solidifying to flow into and completely seal the openings plugged by said solid particles and to seal the remaining cracks and openings.

2. The sealing system of claim 1 wherein said liquid carrier is made of components which solidify when a predetermined temperature is reached.

3. The sealing system of claim 2 wherein said liquid carrier is capable of solidfying at 150° F.

4. The sealing system of claim 3 wherein said liquid carrier comprises a mixture of water and a liquid silicate.

5. The sealing system of claim 4 wherein said liquid carrier comprises twice the amount of silicate than water.

6. The sealing system of claim 5 wherein said silicate is sodium silicate.

7. The sealing system of claim 6 wherein said solid particles is selected from the group consisting essentially of silver solder flakes, lead solder flakes and pure ground pepper.

8. A method of sealing cracks or holes comprising providing a sealing system in the form of solid particles in a liquid carrier, flowing the particles by means of the liquid carrier into large cracks or holes to initially at least partially plug the large cracks with the liquid carrier also being in the large cracks or holes and in other cracks or holes, and solidifying the liquid carrier to completely fill the cracks and holes.

9. The method of claim 8 including solidifying the liquid carrier by the application of heat.

10. The method of claim 9 wherein the cracks or holes are in a combustible engine or engine cooling system, and the heat is applied by starting the engine.

11. The method of claim 10 wherein the liquid carrier is solidified within a few seconds of reaching a predetermined temperature.

12. The method of claim 11 wherein the liquid temperature is at least 150° F. and the liquid carrier is solidified within ten seconds.

13. The method of claim 12 wherein the cracks or holes are in portions of a combustible engine or engine cooling system selected from the group consisting of heating cores, freeze plugs, radiators, heads and head gaskets.

14. The method of claim 13 wherein the engine is cold when the sealing system is applied therein.

15. The method of claim 8 wherein the large cracks or holes are in a radiator and are sealed by both the particles and the solidified liquid carrier.

* * * * *